C. A. BROWN.
RECORDING DEVICE.
APPLICATION FILED AUG. 13, 1910.

1,054,335.

Patented Feb. 25, 1913.

2 SHEETS—SHEET 1.

Witnesses
Jos. Mizer
Mary Malley

Inventor
C. Arthur Brown
By J. D. Richey
His Attorney

C. A. BROWN.
RECORDING DEVICE.
APPLICATION FILED AUG. 13, 1910.

1,054,335.

Patented Feb. 25, 1913.

2 SHEETS—SHEET 2.

Witnesses

Inventor
C. Arthur Brown

By

His Attorney

UNITED STATES PATENT OFFICE.

CHARLES ARTHUR BROWN, OF LORAIN, OHIO.

RECORDING DEVICE.

1,054,335.  Specification of Letters Patent.  Patented Feb. 25, 1913.

Application filed August 13, 1910. Serial No. 577,067.

*To all whom it may concern:*

Be it known that I, CHARLES ARTHUR BROWN, a citizen of the United States, residing at Lorain, in the county of Lorain and State of Ohio, have invented certain new and useful Improvements in Recording Devices; and I do hereby declare the following to be a full, clear, and exact description of the invention, such as will enable others skilled in the art to which it appertains to make and use the same.

This invention relates to the art of indicating and recording variations in levels of liquids, and more particularly to that in which it is necessary to record one level directly and also to record the difference of level existing at any time between that level and another level which may stand at a higher or lower level than the first mentioned. My device is, however, adapted to be used for either the recording of the single level or for the compounding of the movement caused by each and recording of the resultant thereof.

My invention will be best understood by reference to the following description when taken in connection with the accompanying illustration showing one specific embodiment thereof, while its scope will be more particularly pointed out in the appended claims.

Figure 1:
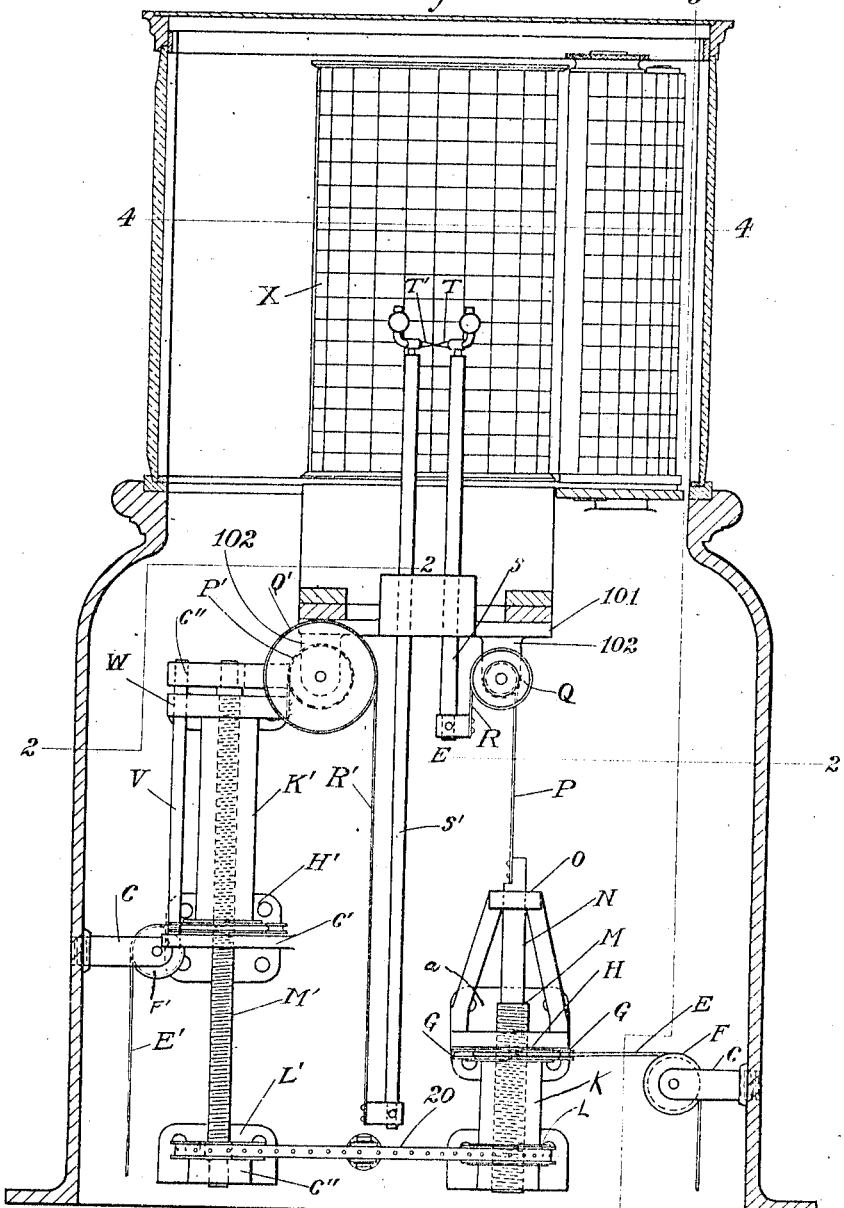
Figure 2:
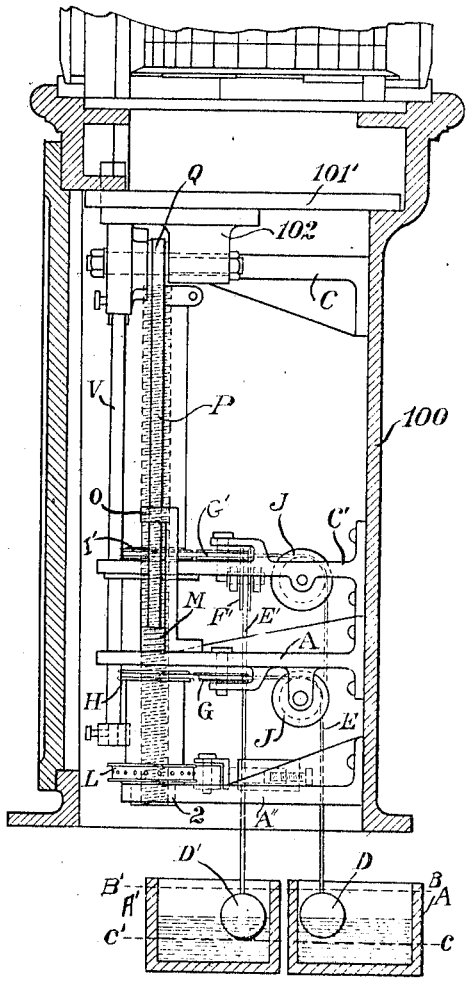
Figure 3:
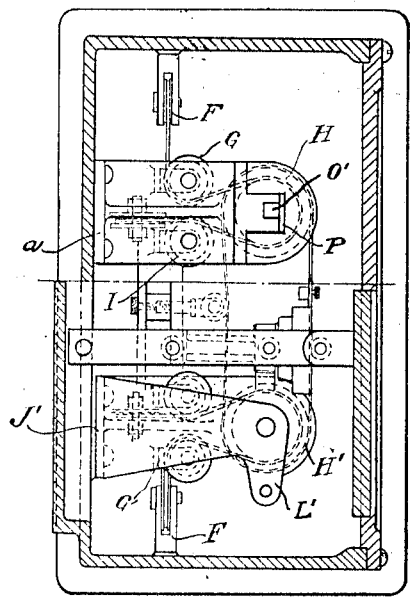
Figure 4:
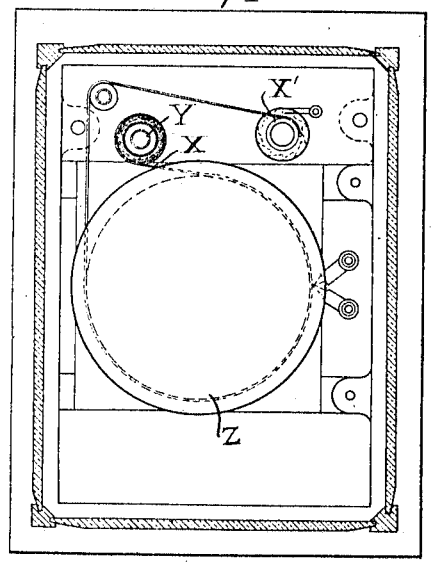

Figure 1 is a vertical cross section. Fig. 2 is a vertical cross section taken along the line 3—3 of Fig. 1. Fig. 8 is a horizontal cross section taken along the line 2—2 of Fig. 1. Fig. 4 is a horizontal cross section taken along the line 4—4 of Fig. 1.

Referring to the drawings and to the embodiment of my invention there shown, I have illustrated the frame at 100. Various brackets (to be described later) are attached to the back of this frame, extend to the interior thereof and support the apparatus.

Referring to Figs. 1 and 2, A represents a tank adapted to contain a liquid whose level may vary between a certain maximum height B and certain minimum level C. A float D is inclosed within this tank and rises and falls with the level of the water. This float is attached to a cable E which passes over an idler F supported by a bracket $c$, attached to the side of the frame 100. The cable then passes to and around the idler G, the sheave H, a third idler I and a fourth idler J, then extends downward. a weight (not shown) being attached to the other end. The idlers I and G and the sheave H are supported by a bracket $a$ attached to the back of the frame, the idlers being journaled between the bracket proper and an arm $a'$ thereof. The sheave H is integral with a circular nut K, which is journaled in the bracket $a$ and $a'$. The nut may rotate, but cannot move rectilineally. A pin wheel L is fastened upon the lower end of the nut K and rotates therewith. A metallic perforated tape 20, serves to communicate any motion of the nut from the pin wheel L to a second pin wheel L'. A threaded shaft or bolt M is mounted in the nut K. From the upper end of this bolt an annular member N extends through a hole O' in a guide O, which is attached to the bracket $a$. The bolt is thus prevented from turning by the square cross-section of N, consequently any motion of the circular nut K serves to cause the bolt M and its extension N, to rise or fall in the guide O. Another tape P is connected at one end to the end of the member N and at the other end to one part of a differential pulley Q which is supported by a hanger 102 dropped from the bridge 101. Another tape R serves to connect the other part of the differential pulley to an arm S which carries the pen point T at its upper end. The differential pulley Q serves to increase the motion communicated to it by the tape P acting through the tape R to the arm S, in such a manner that the motion of the bolt is magnified two times in the motion of the arm S. Of course, I may make this ratio any I desire.

The bolt M and the nut K are provided in the form shown with left hand threads and as arranged will tend to cause the bolt M to rise as the float D falls in the tank A. This rise of the bolt will cause the arm S to fall. As shown, a one foot fall of the float will result in a proportionate fall of the pen point T.

At A' I show a second tank, B' being the maximum or high level and C' a minimum or low level. The float D' in this tank rises and falls with the liquid therein. To this float is attached a cable E' which passes over an idler F' supported by the frame through a bracket $c^2$ to and around the idler G', the sheave H', the idler I', over an idler J' downward, a weight being attached to the other end to keep the cable taut. A bracket c' supports the idlers J', G' and I'. The sheave H' is supported by the bracket c' to rotate thereon.

At K' I show a circular nut which extends through the sheave H'. A vertical channel is cut in C is nut and engages a tongue on the inner periphery of the sheave H' allowing the nut to rise and fall through the sheave, but transmitting the rotary motion of the sheave to the nut.

Journaled in the brackets c' and c'', is a threaded shaft or bolt M' upon one end of which is mounted the aforesaid pin wheel L'. Upon the upper end of the nut K' is shown a yoke W. Through one end of this yoke a guide V extends. This guide is supported parallel to the threaded shaft by the bracket c' and c''. The bolt M' is capable of rotating in its bearings, but is incapable of rectilinear motion. Both the circular nut K' and the bolt are in the illustration shown provided with right hand threads. Any motion of the bolt M' tends to drive the nut along the bolt. Any motion of the sheave H' has the same tendency. The yoke W partakes of the rectilineal motion of the nut, but does not rotate therewith, the connection between the two being such as to permit the nut to turn in the yoke. One end of a tape R' is attached to the other end of this yoke. The other end of the tape is attached to one part of a differential pulley 2'. To the other end of this differential pulley, one end of the tape R' is attached, the other end of the tape being attached to a rod S' which carries a pen T', the motion of the yoke W being transmitted through these two tapes, and the differential pulley to the rod S' and the pin T'. The ratio between the pulleys and the movement of the different parts being such as I may find most convenient.

The various parts and the functions thereof will be better understood from a brief description of the operation. When the float D rises, the weight at the other end of the cord draws on the cable taking up the slack and rotating the sheave H. The motion is transmitted to the nut K and pin wheel L. The nut K in rotating screws up or down the bolt M, the motion of which is transmitted as will readily be apparent through the tape, the pulley and the rod to the pen T, so that the movement of the water level in the tube will be transmitted to the pen. That is, each movement of the surface of the water will be proportioned and transmitted to the pen. Obviously, I may make the proportion any ratio I find convenient. The pen marks upon a sheet of paper X which passes from a roll Y over a cylinder Z to a gravity driven cylinder X'. This apparatus is operated by a spring clock motor in a well known way, the roll X being spring pressed to keep the paper taut.

The pen T' will record the resultant of the movements in the two tanks. This operates as follows: The motion of the float D is transmitted as already described to the tape 20, which causes a rotation of the threaded shaft M' which screws up and down the nut K', the motion of which is transmitted through the tapes, the pulley Q' and the rod S' to the pen T'. The movement of the float D' is transmitted to the nut K' by the sheave H' which, as already stated, will rotate this nut, causing it to move up and down the shaft M', the motion thereof being transmitted as before described to the pen T'. We thus see that the device will not only record the movement of an individual float, but will compound the movements of the two floats and record the resultant.

My device finds a use in connection with filter beds where a difference of level exists owing to the resistance to the flow of water offered by the filtering material. This resistance varies according to the cleanliness or dirtiness of the filtering material. By measuring the resistance of a column of water flowing through the filter bed and that of a second column parallel thereto, that is having the same source and outlet, compounding the two resistances and taking the resultant, I arrive at the resistance of the filter bed. Then by recording the difference with the pen T', I deduce the condition of the filtering material, the apparatus being such that I can tell just the condition of that material at any minute of the day.

While I have more particularly called attention to this special use, I do not wish to be limited thereto, but have merely cited it as an illustration of the utility of my device. It will also be obvious to those skilled in the art, that numerous and extensive departures from the form and the details of the apparatus here shown may be made without departing from the spirit of this invention, the same being herein shown solely for the purpose of clearly illustrating one specific embodiment thereof.

I claim—

1. In a device of the class described, the combination of a fluid basin, a float in said basin adapted to follow the movement of the fluid therein, a second basin, means therein adapted to follow the movement thereof, means including a threaded shaft and a nut associated therewith, one of said members adapted to move rectilineally when the other rotates, said second named means adapted to compound the movements of said float and said first named means, a recording device connected to said compounding means and adapted to be moved thereby and a companion recording device having a movement independent of said means, said recording devices adapted to record the resultant of the movements of said floats as compounded by said means.

2. In a device of the character described, the combination of a fluid basin, a float in said basin adapted to follow the surface of said fluid, a flexible member attached to said float, a sheave around which said flexible member passes, a nut fastened to said sheave, a threaded shaft mounted in said nut and adapted to move in said nut when the same is rotated, a differential pulley and a pen, said pulley connected to said shaft and said pen, whereby movements of said float are transmitted to said pen, the pen moving a proportion of the distance moved by said float and a constantly moving record sheet associated with said pen upon which the record is placed.

3. In a device of the class described, the combination of a fluid receptacle, a device adapted to follow the movements of the surface of the fluid therein, a marker and means to transmit movements of said device to said marker, a record sheet having a movement independent of the movement of said device upon which the marker records the movement of said device, a second fluid receptacle, a second device adapted to follow the movements of the surface of the fluid therein, a second marker, means to transmit movements of each of said devices to said second marker, said second marker marking the resultant of the movements of said devices upon said second sheet.

4. In a device of the class described, the combination of a fluid receptacle, a device to follow the movements of the surface of the fluid therein, a flexible member connected to said device, a sheave over which the flexible member passes and to which movements of said device are transmitted, means for transforming the rotary motion of the sheave into rectilinear motion, a second flexible member adapted to be moved rectilineally by said means, a rectilineally movable recording device for recording the movements of said device and a differential pulley connected to said second flexible member and to said recording device to transmit movement from said member to said recording device.

5. In a device of the class described, the combination of a source of fluid pressure, means responsive to the pressure of said source, a flexible member attached to said means, a sheave around which said flexible member passes, a nut fastened to said sheave, a threaded shaft mounted in said nut and adapted to move in said nut when the same is rotated, a differential pulley and a marker, said pulley being connected to said shaft and said marker whereby changes in pressure in said source are transmitted to said marker, the marker moving in proportion to the changes of pressure and a constantly moving record sheet associated with said marker upon which the record is placed.

6. In a device of the class described, the combination of a source of fluid pressure, means responsive to the changes in pressure of said source, a second source of pressure and means responsive to the changes in pressure thereof, mechanism including a threaded shaft and a nut associated therewith, one adapted to rotate and the other to reciprocate, said mechanism adapted to compound the movements of said first and second named means and devices to record the compounded movements of said means.

In testimony whereof, I affix my signature in the presence of two witnesses.

CHARLES ARTHUR BROWN.

Witnesses:
F. O. RICHEY,
D. A. GLOVER.